US012748453B2

(12) United States Patent
Kusaka et al.

(10) Patent No.: US 12,748,453 B2
(45) Date of Patent: Sep. 29, 2026

(54) OPTICAL COMPUTING DEVICE, OPTICAL COMPUTING METHOD, AND MANUFACTURING METHOD FOR OPTICAL COMPUTING DEVICE

(71) Applicant: FUJIKURA LTD., Tokyo (JP)

(72) Inventors: Hiroyuki Kusaka, Tokyo (JP); Masahiro Kashiwagi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 353 days.

(21) Appl. No.: 18/685,312

(22) PCT Filed: Aug. 18, 2022

(86) PCT No.: PCT/JP2022/031186
§ 371 (c)(1),
(2) Date: Feb. 21, 2024

(87) PCT Pub. No.: WO2023/026946
PCT Pub. Date: Mar. 2, 2023

(65) Prior Publication Data

US 2024/0353887 A1 Oct. 24, 2024

(30) Foreign Application Priority Data

Aug. 23, 2021 (JP) ................................ 2021-135952

(51) Int. Cl.
*G02F 1/035* (2006.01)
*G06E 3/00* (2006.01)

(52) U.S. Cl.
CPC .................................. *G06E 3/005* (2013.01)

(58) Field of Classification Search
CPC .......... G06E 3/005; G02F 3/00; G02F 1/035; G06N 3/067; G06N 3/0675
See application file for complete search history.

(56) References Cited

U.S. PATENT DOCUMENTS 6,373,617 B1 4/2002 Boffi et al.
7,847,225 B2 12/2010 Yokoyama
8,331,798 B2 * 12/2012 Arahira ................ G02F 1/3519 398/198
2003/0161028 A1 8/2003 Gosselin et al.
(Continued)

FOREIGN PATENT DOCUMENTS

JP H09-043654 A 2/1997

OTHER PUBLICATIONS

Arbabi, A., et al., "Dielectric metasurfaces for complete control of phase and polarization with subwavelength spatial resolution and high transmission", Nature Nanotechnology, Aug. 31, 2015, vol. 10, pp. 937-943 (8 pages).

(Continued)

*Primary Examiner* — Jennifer Doan
(74) *Attorney, Agent, or Firm* — Osha Bergman Watanabe & Burton LLP

(57) ABSTRACT

An optical computing device includes an optical modulation element group including optical modulation elements. The optical modulation element group executes first optical computing with respect to a first signal light traveling along an optical path and second optical computing with respect to a second signal light traveling along the optical path in a direction opposite to a traveling direction of the first signal light.

15 Claims, 4 Drawing Sheets

(56) References Cited

U.S. PATENT DOCUMENTS

| | | | | |
|---|---|---|---|---|
| 2017/0081489 | A1 | 3/2017 | Rodriques et al. | |
| 2019/0113684 | A1* | 4/2019 | Tokutaka ................. | G02B 6/32 |
| 2019/0113775 | A1 | 4/2019 | Jang et al. | |

OTHER PUBLICATIONS

Written Opinion of the International Searching Authority issued in corresponding International Application No. PCT/JP2022/031186, dated Sep. 27, 2022 (10 pages).

International Search Report issued in corresponding International Application No. PCT/JP2022/031186, dated Sep. 27, 2022 (5 pages).

* cited by examiner

OPTICAL COMPUTING DEVICE, OPTICAL COMPUTING METHOD, AND MANUFACTURING METHOD FOR OPTICAL COMPUTING DEVICE

BACKGROUND

Technical Field

The present invention relates to an optical computing device including an optical modulation element group and an optical computing method involving use of the optical modulation element group. The present invention further relates to a method for manufacturing such an optical computing device.

Description of the Related Art

There has been known an optical modulation element which has a plurality of cells and which is designed to optically execute predetermined computing by causing signal light beams having passed through the plurality of cells to interfere with each other. Optical computing carried out with use of such an optical modulation element has an advantage of achieving higher speed and lower electric power consumption as compared with electrical computing carried out with use of a processor. Further, multiple-stage optical computing can be achieved by causing two or more optical modulation elements arranged side by side to sequentially act on the signal light.

Patent Literature 1 discloses an optical neural network having an input layer, an intermediate layer, and an output layer. The above-described optical modulation element can be used as, for example, the intermediate layer of such an optical neural network.

PATENT LITERATURE

Patent Literature 1: U.S. Pat. No. 7,847,225

Conventional optical computing devices are configured to execute predetermined optical computing upon when signal light is input into an optical modulation element group in a specific direction. Thus, the conventional optical computing devices cannot execute meaningful optical computing when signal light is input into the optical modulation element group in a direction opposite to the specific direction.

SUMMARY

One or more embodiments provide an optical computing device and an optical computing method each capable of executing meaningful optical computing either in a case where signal light is input into an optical modulation element group in a specific direction or in a case where signal light is input into the optical modulation element group in a direction opposite to the specific direction.

An optical computing device in accordance with one or more embodiments includes: an optical modulation element group including at least one optical modulation element, the optical modulation element group being configured to carry out predetermined first optical computing with respect to first signal light traveling along a specific optical path and to carry out predetermined second optical computing with respect to second signal light traveling along the specific optical path in a direction opposite to the first signal light.

In accordance with one or more embodiments, it is possible to provide an optical computing device and an optical computing method each capable of executing meaningful optical computing either in a case where signal light is input into an optical modulation element group in a specific direction or in a case where signal light is input into the optical modulation element group in a direction opposite to the specific direction.

DESCRIPTION OF THE EMBODIMENTS

First Example (Basic Configuration of Optical Computing Device)

Figure 1:
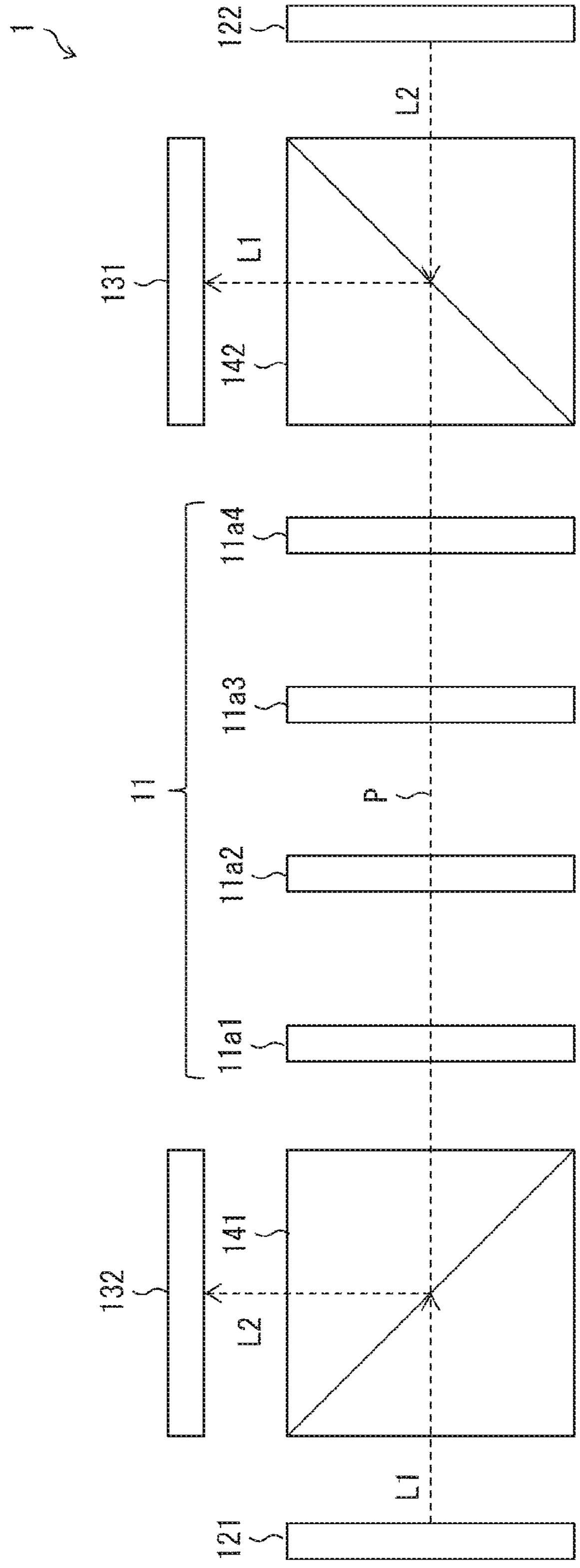
FIG. 1 is a side view illustrating a configuration of an optical computing device in accordance with a first example.

The following description will discuss, with reference to FIG. 1, a basic configuration of an optical computing device 1 in accordance with a first example of one or more embodiments. FIG. 1 is a side view of the optical computing device 1.

As shown in FIG. 1, the optical computing device 1 includes an optical modulation element group 11. The optical modulation element group 11 is a group of n optical modulation elements 11*a*1 to 11*an*. Here, n is any natural number of not less than 1. The example shown in FIG. 1 is a case where n=4.

Each of the optical modulation elements 11*ai* belonging to the optical modulation element group 11 is an element having an optical computing function, that is, a function of converting a two-dimensional intensity distribution of the signal light according to a predetermined conversion rule. Here, i is a natural number of not less than 1 and not more than n. In one or more embodiments, each of the optical modulation elements 11*ai* is a transmissive optical modulation element. Thus, the two-dimensional intensity distribution after the conversion (described earlier) is a two-dimensional intensity distribution of signal light having passed through each optical modulation element 11*ai*. A specific example of each of the optical modulation elements 11*ai* will be described later.

The optical modulation element group 11 receives first signal light L1 and second signal light L2 input thereto. The first signal light L1 is signal light traveling along an optical path P in a forward direction, whereas the second signal light L2 is signal light traveling along the optical path P in an opposite direction. In one or more embodiments, the optical path P is a linear optical path extending through the optical modulation elements 11*ai* included in the optical modulation element group 11.

The first signal light L1 passes through a first optical modulation element 11*a*1, a second optical modulation element 11*a*2, . . . , an n−1-th optical modulation element 11*an*−1, and an n-th optical modulation element 11*an* in this order. Thus, in the optical modulation element group 11, optical computing f=fn·fn−1· . . . , f2·f1 carried out by synthesizing optical computing f1 by the first optical modulation element 11*a*1, optical computing f2 by the second optical modulation element 11*a*2, . . . , optical computing fn−1 by the n−1-th optical modulation element 11*an*−1, and optical computing fn by the n-th optical modulation element 11*an* is executed with respect to the first signal light L1. Thus, a two-dimensional intensity distribution of the first signal light L1 output from the optical modulation element group 11 represents a result f (L1)=fn (fn−1( . . . (f2(f1(L1))) . . . )) of this optical computing f. Hereinafter, this optical computing f may also be referred to as "forward optical computing f".

The second signal light L2 passes through the n-th optical modulation element 11*an*, the n−1-th optical modulation element 11*an*−1, . . . , the second optical modulation element 11*a*2, and the first optical modulation element 11*a*1 in this order. Thus, in the optical modulation element group 11, optical computing g=g1·g2·, . . . , gn−1·gn carried out by synthesizing optical computing g1 by the n-th optical modulation element 11*an*, optical computing gn−1 by the n−1-th optical modulation element 11*an*−1, . . . , optical computing g2 by the second optical modulation element 11*a*2, and optical computing gn by the first optical modulation element 11*a*1 is executed with respect to the second signal light L2. Thus, a two-dimensional intensity distribution of the second signal light L2 output from the optical modulation element group 11 represents a result g (L2)=g1 (g2( . . . (gn−1(gn (L2))) . . . )) of this optical computing g. Hereinafter, this optical computing g may also be referred to as "backward optical computing g".

Each of the optical modulation elements 11*ai* belonging to the optical modulation element group 11 is designed such that the forward optical computing f=fn·fn−1· . . . , f2·f1 coincides with predetermined first optical computing and the backward optical computing g=g1·g2· . . . , gn−1·gn coincides with predetermined second optical computing. The forward optical computing f and the backward optical computing g may be the same type of optical computing or different types of optical computing. In a case where the forward optical computing f and the backward optical computing g are the same type of optical computing, it is possible to realize a bidirectional optical computing device 1 that can provide the same computing result in response both to signal light input from the first optical modulation element 11*a*1 side and to signal light input from the n-th optical modulation element 11*an* side. Meanwhile, in a case where the forward optical computing f and the backward optical computing g are different types of optical computing, it is possible to realize an optical computing device 1 that can provide different computing results in response to signal light input from the first optical modulation element 11*a*1 side and to signal light input from the n-th optical modulation element 11*an* side.

In a case where the optical modulation elements 11*ai* are arranged symmetrically with respect to a plane orthogonal to a straight line including the optical path P, optical computing fi with respect to the signal light L1 and optical computing gi with respect to the second signal light L2 are the same type of optical computing. Even in this case, however, the forward optical computing f and the backward optical computing g can be different types of optical computing, provided that n is not less than 2. The reason is that optical computing f1=g1, optical computing f2=g2, . . . , optical computing fn−1=gn−1, and optical computing fn=gn are not exchangeable.

Note that the first signal light L1 and the second signal light L2 may be identical in wavelength to each other or may be different in wavelength from each other. In a case where the first signal light L1 and the second signal light L2 are different in wavelength from each other, it is easier to make the forward optical computing f coincide with the predetermined first optical computing and to make the backward optical computing g coincide with the predetermined second optical computing. The reason is that this can reduce (i) an influence that the first signal light L1 gives on the second signal light L2 and (ii) an influence that the second signal light L2 gives on the first signal light L1.

Further, the first signal light L1 and the second signal light L2 may be identical in polarization direction to each other or may be different in polarization direction from each other. In a case where the first signal light L1 and the second signal light L2 are different in polarization direction from each other, it is easier to make the forward optical computing f coincide with the predetermined first optical computing and to make the backward optical computing g coincide with the predetermined second optical computing. The reason is that this can reduce (i) an influence that the first signal light L1 gives on the second signal light L2 and (ii) an influence that the second signal light L2 gives on the first signal light L1.

Furthermore, the first signal light L1 and the second signal light L2 may be identical in coherence length to each other or may be different in coherence length from each other. In a case where the first signal light L1 and the second signal light L2 are different in coherence length from each other, it is easy to make the forward optical computing f coincide with the predetermined first optical computing and to make the backward optical computing g coincide with the predetermined second optical computing. The reason is that this can reduce (i) an influence that the first signal light L1 gives on the second signal light L2 and (ii) an influence that the second signal light L2 gives on the first signal light L1.

(Additional Configuration of Optical Computing Device)

The following description will discuss, also with reference to FIG. 1, an additional configuration of the optical computing device 1.

As shown in FIG. 1, the optical computing device 1 preferably further includes a first light emitting device 121 that generates the first signal light L1 having not been subjected to the forward optical computing f yet and a second light emitting device 122 that generates the second signal light L2 having not been subjected to the backward optical computing g yet. This makes it possible to realize bidirectional optical computing even without use of an external light emitting device. Note that, in a case where an external light emitting device is used, one of or both of the first light emitting device 121 and the second light emitting device 122 can be omitted.

Note that, as the first light emitting device 121 and the second light emitting device 122, a two-dimensional display including a plurality of light emitting cells arranged in a matrix can be used, for example.

Further, as shown in FIG. 1, the optical computing device 1 preferably further includes a first light receiving device 131 that detects the first signal light L1 having been subjected to the forward optical computing f and a second light receiving device 132 that detects the second signal light L2 having been subjected to the backward optical computing g. This makes it possible to realize bidirectional optical computing even without use of an external light receiving device. Note that, in a case where an external light receiving device is used, one of or both of the first light receiving device 131 and the second light receiving device 132 can be omitted.

Note that, as the first light receiving device 131 and the second light receiving device 132, a two-dimensional image sensor including a plurality of light receiving cells arranged in a matrix can be used, for example.

Further, as shown in FIG. 1, the optical computing device 1 preferably further includes a first optical element 141 that causes an optical path of one of the first signal light L1 having not been subjected to the forward optical computing f yet and the second signal light L2 having been subjected to the backward optical computing g to branch off from the optical path P (described earlier). The example shown in FIG. 1 illustrates, as the first optical element 141, an optical element that causes an optical path of the second signal light L2 having been subjected to the backward optical computing g to branch off from the optical path P (described earlier). This makes it possible to dispose the first light emitting device 121 and the second light receiving device 132 at different locations, thereby making it easier to mount the optical computing device 1.

Note that, in a case where the first signal light L1 and the second signal light L2 are different in wavelength from each other, the first optical element 141 can be, for example, a beam splitter having a wavelength selecting property that allows one of the first signal light L1 and the second signal light L2 to transmit therethrough and reflects the other. Meanwhile, in a case where the first signal light L1 and the second signal light L2 are different in polarization direction from each other, the first optical element 141 can be, for example, a beam splitter having a polarization-direction selecting property that allows one of the first signal light L1 and the second signal light L2 to transmit therethrough and reflects the other.

As shown in FIG. 1, the optical computing device 1 preferably further includes a second optical element 142 that causes an optical path of one of the second signal light L2 having not been subjected to the backward optical computing g yet and the first signal light L1 having been subjected to the forward optical computing f to branch off from the optical path P (described earlier). The example shown in FIG. 1 illustrates, as the second optical element 142, an optical element that causes an optical path of the first signal light L1 having been subjected to the forward optical computing f to branch off from the optical path P (described earlier). This makes it possible to dispose the second light emitting device 122 and the first light receiving device 131 at different locations, thereby making it easier to mount the optical computing device 1.

Note that, in a case where the first signal light L1 and the second signal light L2 are different in wavelength from each other, the second optical element 142 can be, for example, a beam splitter having a wavelength selecting property that allows one of the first signal light L1 and the second signal light L2 to transmit therethrough and reflects the other. Meanwhile, in a case where the first signal light L1 and the second signal light L2 are different in polarization direction from each other, the second optical element 142 can be, for example, a beam splitter having a polarization-direction selecting property that allows one of the first signal light L1 and the second signal light L2 to transmit therethrough and reflects the other.

(Specific Example of Optical Modulation Element)

Figure 2:
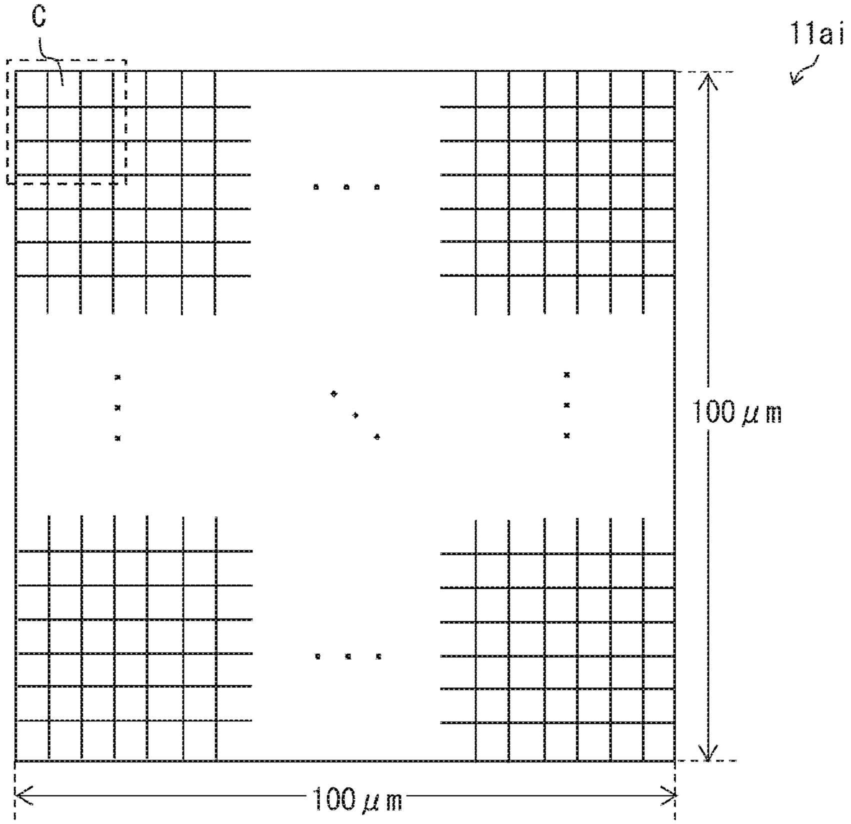
FIG. 2 is a plan view illustrating a specific example of an optical modulation element included in the optical computing device shown in FIG. 1.
Figure 3:
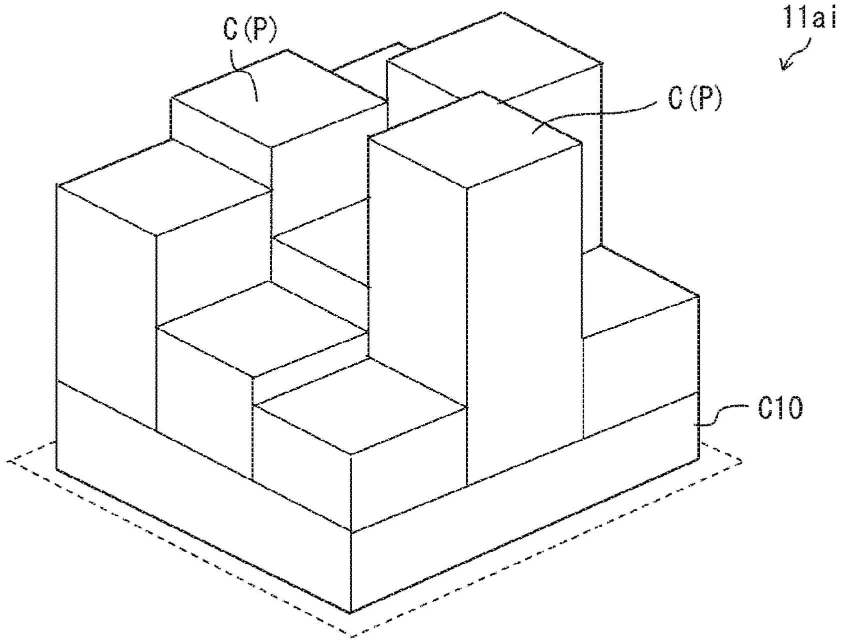
FIG. 3 is an enlarged perspective view of a part of the optical modulation element shown in FIG. 2.

The following description will discuss, with reference to FIGS. 2 and 3, a specific example of the optical modulation element 11*ai*. FIG. 2 is a plan view of the optical modulation element 11*ai* in accordance with the present specific example. FIG. 3 is an enlarged perspective view of a part (i.e., a part surrounded by the broken lines in FIG. 2) of the optical modulation element 11*ai* in accordance with the present specific example.

As shown in FIG. 2, the optical modulation element 11*ai* includes a plurality of microcells C having thicknesses or refractive indices that are independently set. When signal light beams enter the optical modulation element 11*ai*, the signal light beams are diffracted by the microcells C so as to have different phases, and then interfere with each other. Consequently, predetermined optical computing (conversion of a two-dimensional intensity distribution according to a predetermined conversion rule) is carried out. Here, the "microcell" means a cell having a cell size of less than 10 μm, for example. Further, the "cell size" means a square root of an area of a cell. For example, given that the microcell C has a square shape in a plan view, a cell size of the microcell C means a length of one side of the microcell C. A lower limit of the cell size of the microcell C is 1 nm, for example.

The optical modulation element 11*ai* shown in FIG. 2 as an example is constituted by 200×200 microcells C arranged in a matrix. A shape of each microcell C in a plan view is a square of 500 nm×500 nm. A shape of the optical modulation element 11*ai* in a plan view is a square of 100 μm×100 μm.

A phase-change amount of signal light passing through each microcell C can be set independently for the cell by (1) setting a thickness of the microcell C independently for the cell or (2) selecting a refractive index of the microcell C independently for the cell. One or more embodiments employ the method (1), which can be carried out by nano-imprinting. In this case, as shown in FIG. 3, each microcell C is constituted by a pillar P having a quadrangular prism shape having a square bottom surface with sides each having a length equal to a cell size. In this case, the phase-change amount of the signal light passing through each microcell C is determined in accordance with a height of a pillar P constituting the microcell C. That is, signal light that passes through a microcell C constituted by a pillar P having a high height has a large phase-change amount, whereas signal light that passes through a microcell C constituted by a pillar P having a low height has a small phase-change amount.

As shown in FIG. 3, the pillars P are disposed on a transparent substrate C10. In this case, either of the transparent substrate C10 side or the pillar P side can be an incident surface through which light of the optical modulation element 11*ai* enters. Either in a case where the incident surface is the transparent substrate C10 side or in a case where the incident surface is the pillar P side, signal light beams having been diffracted by the microcells C (pillars P) and having different phases interfere with each other, so that predetermined optical computing is carried out.

Note that, in a case where the first signal light L1 and the second signal light L2 are different in wavelength from each other, the optical modulation element Ci is preferably constituted by a cell acting mainly on the first signal light (e.g., a cell whose cell size matches the wavelength of the first signal light L1) and a cell acting mainly on the second signal light (e.g., a cell whose cell size matches the wavelength of the second signal light L2). This makes it further easier to make the forward optical computing f coincide with the predetermined first optical computing and to make the backward optical computing g coincide with the predetermined second optical computing.

Meanwhile, in a case where the first signal light L1 and the second signal light L2 are different in polarization direction from each other, the optical modulation element Ci is preferably constituted by a cell acting mainly on the first signal light (e.g., a cell whose longitudinal direction matches the polarization direction of the first signal light L1) and a cell acting mainly on the second signal light (e.g., a cell whose longitudinal direction matches the polarization direction of the second signal light L2). This makes it further easier to make the forward optical computing f coincide with the predetermined first optical computing and to make the backward optical computing g coincide with the predetermined second optical computing.

Note that the thickness or refractive index of each microcell C can be set, for example, through machine learning. A model used in this machine learning can be, for example, a model in which a two-dimensional intensity distribution of signal light input into the optical modulation element 11*ai* is an input, and a two-dimensional intensity distribution of signal light output from the optical modulation element 11*ai* is an output and which includes a thickness or refractive index of each microcell C as a parameter. Here, the two-dimensional intensity distribution of the signal light input into the optical modulation element 11*ai* means a set of intensities of signal light input into the respective microcells C that constitute the optical modulation element 11*ai*. Further, the two-dimensional intensity distribution of the signal light output from the optical modulation element 11*ai* means a set of intensities of signal light input into microcells C constituting an optical modulation element 11*ai*+1 disposed to follow the optical modulation element 11*ai* or a set of intensities of signal light input into cells constituting a light receiving device disposed to follow the optical modulation element 11*ai*.

Second Example (Basic Configuration of Optical Computing Device)

Figure 4:
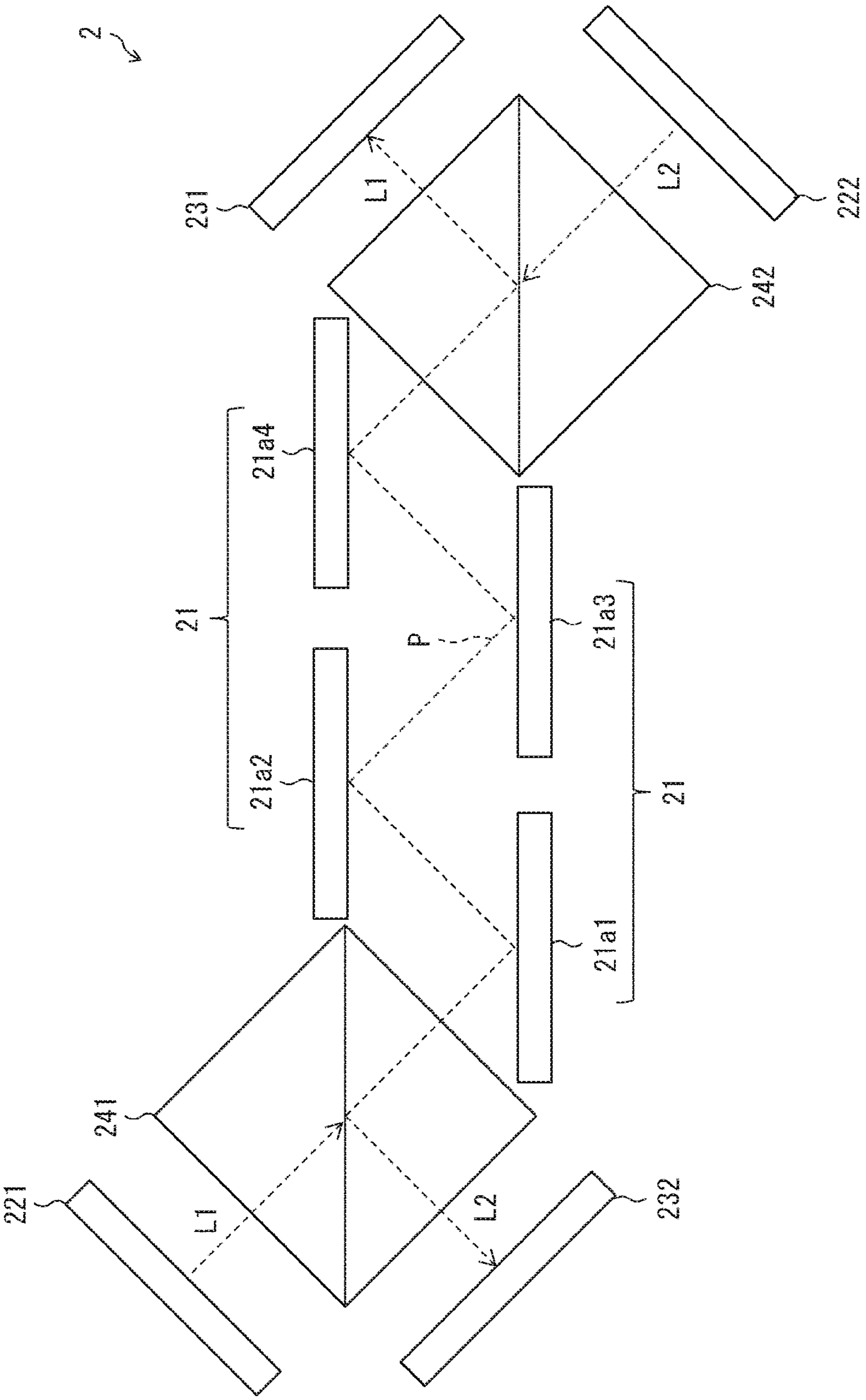
FIG. 4 is a side view illustrating a configuration of an optical computing device in accordance with a second example.

The following description will discuss, with reference to FIG. 4, a basic configuration of an optical computing device 2 in accordance with a second example of one or more embodiments. FIG. 4 is a side view of the optical computing device 2.

As shown in FIG. 4, the optical computing device 2 includes an optical modulation element group 21. The optical modulation element group 21 is a group of n optical modulation elements 21*a*1 to 21*an*. Here, n is any natural number of not less than 1. The example shown in FIG. 4 is a case where n=4.

Each of the optical modulation elements 21*ai* belonging to the optical modulation element group 21 is an element that has an optical computing function, that is, a function of converting a two-dimensional intensity distribution of the signal light according to a predetermined conversion rule. Here, i is a natural number of not less than 1 and not more than n. In one or more embodiments, a reflective optical modulation element is used as each optical modulation element 21*ai*. Thus, a two-dimensional intensity distribution of signal light reflected by each optical modulation element 21*ai* is the two-dimensional intensity distribution after the conversion (described earlier). A specific example of each optical modulation element 21*ai* will be described later.

The optical modulation element group 21 receives first signal light L1 and second signal light L2 input thereto. The first signal light L1 is signal light traveling along an optical path P in a forward direction, whereas the second signal light L2 is signal light traveling along the optical path P in a direction opposite to the forward direction. In one or more embodiments, the optical path P is a zigzag optical path extending through the optical modulation elements 21*ai* included in the optical modulation element group 21.

The first signal light L1 is reflected by a first optical modulation element 21*a*1, a second optical modulation element 21*a*2, . . . , an n−1-th optical modulation element 21*an*−1, and an n-th optical modulation element 21*an* in this order. Thus, in the optical modulation element group 21, optical computing f=fn·fn−1·, . . . , f2·f1 carried out by synthesizing optical computing f1 by the first optical modulation element 21*a*1, optical computing f2 by the second optical modulation element 21*a*2, . . . , optical computing fn−1 by the n−1-th optical modulation element 21*an*−1, and optical computing fn by the n-th optical modulation element 21*an* is executed with respect to the first signal light L1. Thus, a two-dimensional intensity distribution of the first signal light L1 output from the optical modulation element group 21 represents a result f (L1)=fn (fn−1( . . . (f2(f1(L1))) . . . )) of this optical computing f. Hereinafter, this optical computing f may also be referred to as "forward optical computing f".

The second signal light L2 is reflected by the n-th optical modulation element 21*an*, the n−1-th optical modulation element 21*an*−1, . . . , the second optical modulation element 21*a*2, and the first optical modulation element 21*a*1 in this order. Thus, in the optical modulation element group 21, optical computing g=g1·g2·, . . . , gn−1·gn carried out by synthesizing optical computing g1 by the n-th optical modulation element 21*an*, optical computing gn−1 by the n−1-th optical modulation element 21*an*−1, . . . , optical computing g2 by the second optical modulation element 21*a*2, and optical computing gn by the first optical modulation element 21*a*1 is executed with respect to the second signal light L2. Thus, a two-dimensional intensity distribution of the second signal light L2 output from the optical modulation element group 21 represents a result g (L2)=g1(g2( . . . (gn−1(gn (L2))) . . . )) of this optical computing g. Hereinafter, this optical computing g may also be referred to as "backward optical computing g".

The optical modulation elements 21*ai* belonging to the optical modulation element group 21 are designed such that the forward optical computing f=fn·fn−1·, . . . , f2·f1 coincides with predetermined first optical computing and the backward optical computing g=g1·g2·, . . . , gn−1·gn coincides with predetermined second optical computing. The forward optical computing f and the backward optical computing g may be the same type of optical computing or different types of optical computing. In a case where the forward optical computing f and the backward optical computing g are the same type of optical computing, it is possible to realize a bidirectional optical computing device 2 that can provide the same computing result in response both to signal light input from the first optical modulation element 21*a*1 side and to signal light input from the n-th optical modulation element 21*an* side. Meanwhile, in a case where the forward optical computing f and the backward optical computing g are different types of optical computing, it is possible to realize an optical computing device 2 that can provide different computing results in response to signal light input from the first optical modulation element 21*a*1 side and to signal light input from the n-th optical modulation element 21*an* side.

In a case where the optical modulation elements 21*ai* are arranged symmetrically with respect to a plane orthogonal to a plane including the optical path P, optical computing fi with respect to the signal light L1 and optical computing gi with respect to the second signal light L2 are the same type of optical computing. Even in this case, however, the forward optical computing f and the backward optical computing g can be different types of optical computing, provided that n is not less than 2. The reason is that optical computing f1=g1, optical computing f2=g2, . . . , optical computing fn−1=gn−1, and optical computing fn=gn are not exchangeable.

Note that the first signal light L1 and the second signal light L2 may be identical in wavelength to each other or may be different in wavelength from each other. In a case where the first signal light L1 and the second signal light L2 are different in wavelength from each other, it is easier to make the forward optical computing f coincide with the predetermined first optical computing and to make the backward optical computing g coincide with the predetermined second optical computing. The reason is that this can reduce (i) an influence that the first signal light L1 gives on the second signal light L2 and (ii) an influence that the second signal light L2 gives on the first signal light L1.

Further, the first signal light L1 and the second signal light L2 may be identical in polarization direction to each other or may be different in polarization direction from each other. In a case where the first signal light L1 and the second signal light L2 are different in polarization direction from each other, it is easier to make the forward optical computing f coincide with the predetermined first optical computing and to make the backward optical computing g coincide with the predetermined second optical computing. The reason is that this can reduce (i) an influence that the first signal light L1 gives on the second signal light L2 and (ii) an influence that the second signal light L2 gives on the first signal light L1.

Furthermore, the first signal light L1 and the second signal light L2 may be identical in coherence length to each other or may be different in coherence length from each other. In a case where the first signal light L1 and the second signal light L2 are different in coherence length from each other, it is easier to make the forward optical computing f coincide with the predetermined first optical computing and to make the backward optical computing g coincide with the predetermined second optical computing. The reason is that this can reduce (i) an influence that the first signal light L1 gives on the second signal light L2 and (ii) an influence that the second signal light L2 gives on the first signal light L1.

Note that it is preferable that odd-numbered optical modulation elements **21*a*1, 21*a*3, . . . be integrally formed on a single substrate. This can eliminate the need to adjust relative positions of the odd-numbered optical modulation elements 21*a*1, 21*a*3, . . . . Meanwhile, it is preferable that even-numbered optical modulation elements 21*a*2, 21*a*4, . . . be integrally formed on a single substrate. This can eliminate the need to adjust relative positions of the even-numbered optical modulation elements 21*a*2, 21*a*4**, . . . .

(Additional Configuration of Optical Computing Device)

The following description will discuss, also with reference to FIG. 4, an additional configuration of the optical computing device 2.

As shown in FIG. 4, the optical computing device 2 preferably further includes a first light emitting device 221 that generates the first signal light L1 having not been subjected to the forward optical computing f yet and a second light emitting device 222 that generates the second signal light L2 having not been subjected to the backward optical computing g yet. This makes it possible to realize bidirectional optical computing even without use of an external light emitting device. Note that, in a case where an external light emitting device is used, one of or both of the first light emitting device 221 and the second light emitting device 222 can be omitted.

Note that, as the first light emitting device 221 and the second light emitting device 222, a two-dimensional display including a plurality of light emitting cells arranged in a matrix can be used, for example.

Further, as shown in FIG. 4, the optical computing device 2 preferably further includes a first light receiving device 231 that detects the first signal light L1 having been subjected to the forward optical computing f and a second light receiving device 232 that detects the second signal light L2 having been subjected to the backward optical computing g. This makes it possible to realize bidirectional optical computing even without use of an external light receiving device. Note that, in a case where an external light receiving device is used, one of or both of the first light receiving device 231 and the second light receiving device 232 can be omitted.

Note that, as the first light receiving device 231 and the second light receiving device 232, a two-dimensional image sensor including light receiving cells arranged in a matrix can be used, for example.

Further, as shown in FIG. 4, the optical computing device 2 preferably further includes a first optical element 241 that causes an optical path of one of the first signal light L1 having not been subjected to the forward optical computing f yet and the second signal light L2 having been subjected to the backward optical computing g to branch off from the optical path P (described earlier). The example shown in FIG. 4 illustrates, as the first optical element 241, an optical element that causes an optical path of the second signal light L2 having been subjected to the backward optical computing g to branch off from the optical path P (described earlier). This makes it possible to dispose the first light emitting device 221 and the second light receiving device 232 at different locations, thereby making it easier to mount the optical computing device 2.

Note that, in a case where the first signal light L1 and the second signal light L2 are different in wavelength from each other, the second optical element 241 can be, for example, a beam splitter having a wavelength selecting property that allows one of the first signal light L1 and the second signal light L2 to transmit therethrough and reflects the other. Meanwhile, in a case where the first signal light L1 and the second signal light L2 are different in polarization direction from each other, the first optical element 241 can be, for example, a beam splitter having a polarization-direction selecting property that allows one of the first signal light L1 and the second signal light L2 to transmit therethrough and reflects the other.

Further, as shown in FIG. 4, the optical computing device 2 preferably further includes a second optical element 242 that causes an optical path of one of the second signal light L2 having not been subjected to the backward optical computing g yet and the first signal light L1 having been subjected to the forward optical computing f to branch off from the optical path P (described earlier). The example shown in FIG. 4 illustrates, as the second optical element 242, an optical element that causes an optical path of the first signal light L1 having been subjected to the forward optical computing f to branch off from the optical path P (described earlier). This makes it possible to dispose the second light emitting device 222 and the first light receiving device 231 at different locations, thereby making it easier to mount the optical computing device 2.

Note that, in a case where the first signal light L1 and the second signal light L2 are different in wavelength from each other, the second optical element 242 can be, for example, a beam splitter having a wavelength selecting property that allows one of the first signal light L1 and the second signal light L2 to transmit therethrough and reflects the other. Meanwhile, in a case where the first signal light L1 and the second signal light L2 are different in polarization direction from each other, the second optical element 242 can be, for example, a beam splitter having a polarization-direction selecting property that allows one of the first signal light L1 and the second signal light L2 to transmit therethrough and reflects the other.

(Specific Example of Optical Modulation Element)

Figure 5:
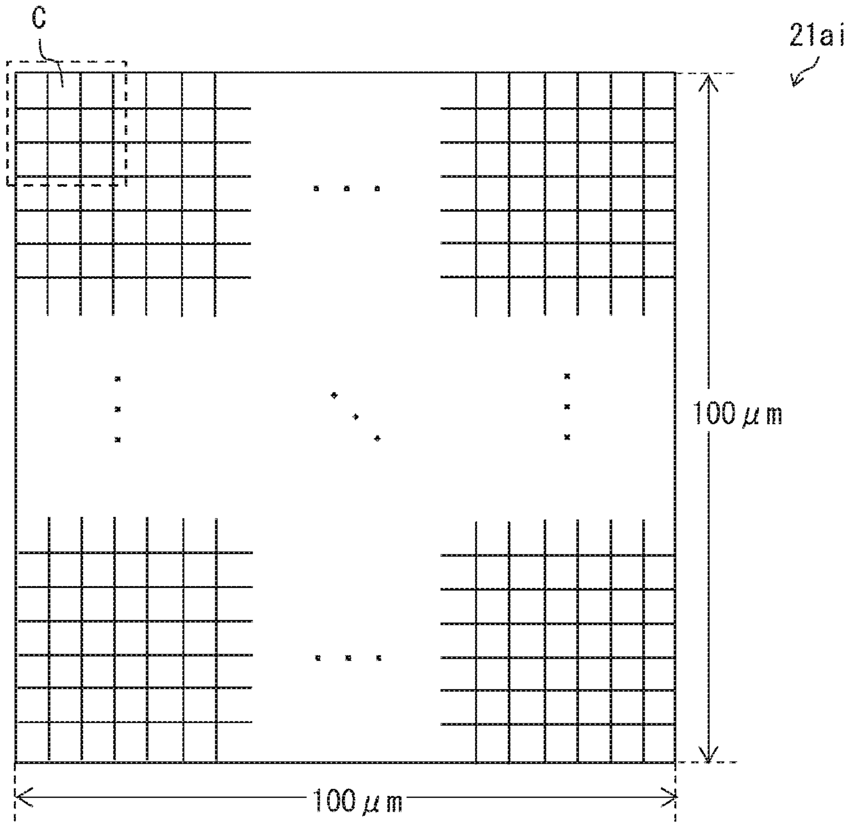
FIG. 5 is a plan view illustrating a specific example of an optical modulation element included in the optical modulation device shown in FIG. 4.
Figure 6:
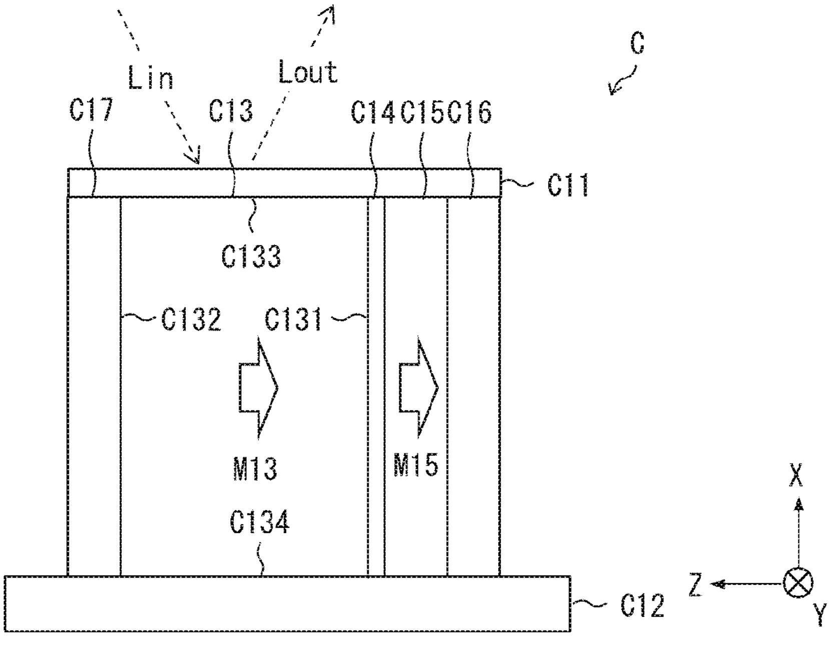
FIG. 6 is a cross-sectional view illustrating a specific example of a cell included in the optical modulation element shown in FIG. 5.

The following description will discuss, with reference to FIGS. 5 and 6, a specific example of the optical modulation element 21*ai*. FIG. 5 is a plan view of the optical modulation element 21*ai* in accordance with the present specific example. FIG. 6 is a cross-sectional view of a microcell C constituting the optical modulation element 21*ai* in accordance with the present specific example.

As shown in FIG. 5, the optical modulation element 21*ai* includes a plurality of microcells C having phase-modulation amounts (phase-change amounts) that are independently set. When signal light beams enter the optical modulation element 21*ai*, the signal light beams having been modulated and reflected by the microcells C to have different phases interfere with each other, so that predetermined optical computing (conversion of a two-dimensional intensity distribution according to a predetermined conversion rule). Here, the "microcell" means a cell having a cell size of less than 10 μm, for example. Further, the "cell size" means a square root of an area of a cell. For example, given that the microcell C is in the form of a square in a plan view, a cell size of the microcell C means a length of one side of the microcell C. A lower limit of the cell size of the microcell C is 1 nm, for example.

The optical modulation element 21*ai* shown in FIG. 5 as an example is constituted by 200×200 microcells arranged in a matrix. A shape of each microcell in a plan view is a square of 500 nm×500 nm. A shape of the optical modulation element 21*ai* in a plan view is a square of 100 μm×100 μm.

As shown in FIG. 6, the microcell C includes a polarizing plate C11, a substrate C12, a block C13, a spacer layer C14, a magnetized fixed layer C15, an electrode C16, and an electrode C17. In the following description, among directions normal to an optically effective surface C133 of the block C13, a direction extending from the optically effective surface C133 toward the outside of the block C13 is regarded as an x-axis positive direction. Among directions normal to a surface C131 and a surface C132 of the block C13, a direction extending from the surface C131 toward the surface 132 is regarded as a z-axis positive direction. A direction that constitutes a right-handed orthogonal coordinate system together with the x-axis positive direction and the z-axis positive direction is regarded as a y-axis positive direction.

In the microcell C, incident light Lin enters the optically effective surface C133 in a direction inclined, by an incidence angle, from an x-axis direction perpendicular to the optically effective surface C133 to the z-axis positive direction. Note that the polarizing plate C11 is provided so as to precede the block C13 when viewed from the incident light Lin. Light that has entered the optically effective surface C133 propagates through the inside of the block C13 in a direction extending toward the substrate C12 (approximately an x-axis negative direction) is reflected by an interface between the block C13 and the substrate C12, propagates through the inside of the block C13 in a direction extending toward the optically effective surface C133 (approximately the x-axis positive direction). Then, the light outgoes, as light L12, from the optically effective surface C133, in a direction inclined, by an outgoing angle corresponding to the incidence angle, from the x-axis direction perpendicular to the optically effective surface C133 to a z-axis negative direction. Note that FIG. 6 does not illustrate an optical path inside the block C13. In the present specific example, the incidence angle and the outgoing angle are each 10° ". Note, however, that the incidence angle and the outgoing angle are not limited to 10°, and can be set as appropriate.

The substrate C12 is a plate-like member configured to have a main surface (x-axis positive direction side main surface) that is in contact with the block C13 and that regularly reflects light. The substrate C12 is made of a material that is not particularly limited. Note, however, that the substrate C12 has at least a main surface made of a material that reflects light. The main surface is preferably configured flat so as to regularly reflect light. The present specific example employs, as the substrate C12, quartz glass having a main surface on which an aluminum thin film is provided. Note, however, that a reflecting member is not limited to aluminum and can be (i) a metallic film that is not an aluminum film or (ii) a dielectric multilayered film. The substrate C12 is not limited to this. The substrate C12 can be a plate-like member that is made of a metal or a semiconductor and that has a main surface having been finished so as to be a mirror surface. Examples of the metal of which the substrate C12 is made include aluminum and copper, and examples of the semiconductor of which the substrate C12 is made include silicon. The block C13 has a reflecting surface C134 that is fixed to the x-axis positive direction side main surface of the substrate C12. In the present specific example, a resin is used as a fixing member for fixing the substrate C12 and the block C13 to each other. Note, however, that the fixing member is not limited to this.

The block C13 is made of a material that is light-transmissive to the incident light Lin. The block C13 contains a magnetic atom. The block C13 has a magnetization state that is not fixed. Thus, the block C13 only needs to be made of a material whose magnetic susceptibility can be easily changed by spin injection. Examples of the material of which the block C13 is made include various materials such as a paramagnetic material and a ferromagnetic material. In order to achieve higher magnetic susceptibility, the block C13 is preferably configured so as to exhibit ferromagnetism at room temperature (e.g., 25° C.) and is suitably made of a ferromagnetic material that has a relatively high spin polarizability. The spin polarizability is preferably, for example, not less than 50%. The present specific example employs CoFeB as the material of which the block C13 is made. Note, however, that not only CoFeB but also CoFe, NiFe, Fe, Ni, Co, or the like can be suitably used. The block C13 does not need to be composed of a single composition. It is also possible to employ an insulator (e.g., alumina or glass) containing fine particles (described earlier) added thereto.

As will be described later, the magnetized fixed layer C15 is also made of a material that exhibits ferromagnetism (more specifically, hard magnetism). Note here that the block C13 has a smaller coercive force than that of the magnetized fixed layer C15. This makes it possible to change a direction of magnetization M13 of the block C13 while fixing a direction of magnetization M15 of the magnetized fixed layer C15. The magnetization M13 can take a direction the same as or opposite to that of the magnetization M15, among directions parallel to or substantially parallel to the magnetization M15.

CoFeB that is employed, in the present specific example, as the material of which the block C13 is made is one example of a ferromagnetic material that has a sufficiently small coercive force at room temperature and in which remanent magnetization is sufficiently small at room temperature (i.e., a soft magnetic material). The material of which the block C13 is made is not limited to the soft magnetic material. Note, however, that the block C13 that is made of a soft magnetic material allows magnetization remaining in the block C13 to be sufficiently small relative to saturated magnetization at room temperature when injection of polarized electrons is stopped. Thus, in a case where the block C13 that is volatile is used, the block C13 is preferably made of a ferromagnetic material in which remanent magnetization at room temperature is sufficiently small with respect to saturated magnetization at room temperature. Note here that the expression "remanent magnetization at room temperature is sufficiently small with respect to saturated magnetization at room temperature" means, for example, that remanent magnetization at room temperature is not less than 0% and less than 10% of saturated magnetization at room temperature. According to this configuration, in a case where spin-polarized electrons are injected into the block C13, magnetic interaction occurs between magnetic atoms contained in the block C13, so that the magnetization M13 occurs. Meanwhile, in a case where injection of spin-polarized electrons into the block C13 is stopped, the interaction occurring between the magnetic atoms contained in the block C13 disappears, so that the magnetization M13 also disappears. Thus, this configuration can cause the magnetization M13 to occur or disappear in a volatile manner with use of injection of spin-polarized electrons. This allows the microcell C to control a degree of phase delay of a component whose polarization plane is parallel to a zx plane, among light propagating through the inside of the block C13.

Note that a ferromagnetic material in which remanent magnetization at room temperature is relatively large with respect to saturated magnetization at room temperature (i.e., a hard magnetic material) may be used for the block C13. Note here that the expression "remanent magnetization at room temperature is relatively large with respect to saturated magnetization at room temperature" means, for example, that remanent magnetization at room temperature is not less than 90% and not more than 100% of saturated magnetization at room temperature. According to this configuration, the magnetization M13 caused by injection of spin-polarized electrons does not disappear but remains even after the injection of spin-polarized electrons is stopped. Thus, in a case where this configuration is employed, a phase in a component whose polarization plane is parallel to the zx plane can be delayed in a non-volatile manner even after the injection of spin-polarized electrons is stopped.

In the present specific example, a proportion of remanent magnetization at room temperature to saturated magnetization at room temperature in the material of which the block C13 is made is not limited to not less than 0% and less than 10% or not less than 90% and not more than 100%, and may be not less than 10% and less than 90%.

In a case where the block C13 exhibits paramagnetism, the magnetization M13 can take various directions. However, in a case where spin-polarized electrons are injected into the block C13, the magnetization M13 in a macro perspective can take a direction which is parallel or substantially parallel to the magnetization M15 and which is the same as or opposite to that of the magnetization M15.

In the present specific example, the block C13 has a rectangular parallelepiped shape. Thus, the block C13 is constituted by six surfaces. In the block C13, two planes that are parallel to an xy plane and that face each other are regarded as surfaces C131 and C132. Furthermore, two planes that are parallel to a yz plane and that face each other are regarded as the optically effective surface C133 and the reflecting surface C134. In the present specific example, each of the optically effective surface C133 and the reflecting surface C134 is a flat surface (i.e., a planar surface). Note, however, that each of the optically effective surface C133 and the reflecting surface C134 is not limited to a planar surface, and may be an uneven surface. Such an uneven structure can be a periodic structure or a random structure. By appropriately designing the uneven structure, it is possible to reduce reflection loss that can occur in the optically effective surface C133 and the reflecting surface C134.

The spacer layer C14 is a layer member that is made of an insulator. The spacer layer C14 is provided between the block C13 and the magnetized fixed layer C15 (described later), and insulates the block C13 and the magnetized fixed layer C15 from each other. The spacer layer C14, together with the block C13 and the magnetized fixed layer C15, forms a tunnel junction. Thus, it is possible to determine a thickness of the spacer layer C14 as appropriate within a range in which an electric current can tunnel through the tunnel junction. The spacer layer C14 typically has a thickness of not less than 2 nm and not more than 3 nm. Note, however, that the thickness of the spacer layer C14 is not limited to this. In order to exhibit a good tunnel characteristic, it is preferable that the spacer layer C14 contain no pinhole and be made of a film having a uniform thickness. Use of spin-polarized electrons as a tunnel electric current carrier allows magnetization of the block C13 to be switched with lower electric power and at a higher speed. As described above, the microcell C functions as a spin injection type phase modulator involving use of the tunnel junction.

The present specific example employs an aluminum oxide ($Al_2O_3$) insulator as the insulator of which the spacer layer C14 is made. Note, however, that this insulator does not necessarily need to be an aluminum oxide insulator. Alternatively, for example, this insulator can be an insulator of which a spacer layer of a magnetoresistive random access memory (MRAM) is made. Note that the spacer layer C14 can be omitted in the microcell C.

The magnetized fixed layer C15 is a layer member that is made of an electrically conductive ferromagnetic material. In the present specific example, the magnetized fixed layer C15 is indirectly provided to the surface C131 via the spacer layer C14. Note, however, that the magnetized fixed layer C15 may alternatively be directly provided to the surface 131. The ferromagnetic material of which the magnetized fixed layer C15 is made exhibits ferromagnetism at room temperature. The magnetized fixed layer C15 has a greater coercive force than the block C13. The present specific example employs Permalloy, which is an alloy of nickel and iron, as the ferromagnetic material of which the magnetized fixed layer C15 is made. There is no limitation on a compositional ratio between nickel and iron. Note, however, that the compositional ratio can be, for example, Ni81Fe19. This ferromagnetic material is not limited to Permalloy. Alternatively, for example, this ferromagnetic material can be a ferromagnetic material of which a magnetized fixed layer of an MRAM is made, such as a magnesium oxide. There is no limitation also on a thickness of the magnetized fixed layer C15, and the thickness of the magnetized fixed layer C15 can be determined as appropriate.

A type of the magnetized fixed layer C15 is roughly divided into an out-plane magnetization type and an in-plane magnetization type in accordance with the direction of the magnetization M15. In the magnetized fixed layer C15 of the in-plane magnetization type, as illustrated in FIG. 6, the direction of the magnetization M15 is substantially orthogonal to a traveling direction (x-axis direction) of the incident light Lin, among in-plane directions of a main surface of the magnetized fixed layer C15. The microcell C employs the in-plane magnetization type magnetized fixed layer C15 in which the direction of the magnetization M15 is a y-axis negative direction. Since the direction of the magnetization M13 of the block C13 is parallel to the direction of the magnetization M15, the direction of the magnetization M13 is also parallel to the y-axis direction. In the microcell C, the polarizing plate C11 is provided on an optical path of the incident light Lin, which is incident light. The polarizing plate C11 has a transmission axis A11 oriented in parallel to the z-axis direction in the yz plane, as illustrated in FIG. 6. Thus, the polarizing plate C11 allows, among components of the incident light Lin, only linearly polarized light whose polarization direction is parallel to the z-axis to pass therethrough so as to enter the optically effective surface C133.

According to this configuration, the direction of the magnetization M13 (z-axis direction) is orthogonal or substantially orthogonal to the polarization direction of the incident light Lin (z-axis direction). Thus, due to interaction between the incident light Lin and the magnetization M13, a transverse Kerr effect occurs in the incident light Lin. Therefore, the microcell C can emit the outgoing light Lout whose phase is delayed than that of the incident light Lin propagating through the inside of the block C13 in parallel to the x-axis direction. That is, the microcell C can delay the phase of light. Note that a degree to which the block C13 is to delay the phase of the incident light Lin depends on a magnetic field formed inside the block C13. This degree therefore depends on the magnitude of the magnetization M15 and an amount of spin injection into the block C13. The microcell C thus can modulate a phase of incident light.

Electrodes C16 and C17, which are a pair of electrodes, are each a layer member that is made of a conductor. The present specific example employs copper as the conductor of which the electrodes C16 and C17 are made. Note, however, that this conductor is not limited to copper. This conductor preferably has a high electric conductivity. Examples of this conductor include not only copper but also silver and gold. The electrode C16 is provided to the surface C131 via the spacer layer C14 and the magnetized fixed layer C15. Thus, the spacer layer C14, the magnetized fixed layer C15, and the electrode C16 are layered in this order on the surface C131. The electrode C17 is directly provided to the surface C132. Thus, the electrodes C16 and C17 are provided so as to face each other, and the electrode C16, the magnetized fixed layer C15, the spacer layer C14, and the electrode C17 are arranged in this order. It can also be said that the electrodes C16 and C17 sandwich therebetween the block C13, the spacer layer C14, and the magnetized fixed layer C15. The electrodes C16 and C17 are examples of a first electrode and a second electrode, respectively.

Either a positive electrode or a negative electrode of a power source is connected to each of the electrodes C16 and C17, and a voltage can be applied between the electrodes. By injecting spin-polarized electrons into the block C13 with use of the electrodes C16 and C17, the block C13 is magnetized. The block C13 functions as an optical path of light that propagates from the optically effective surface C133, passes through the reflecting surface C134, and propagates again toward the optically effective surface C133. Thus, the electrodes C16 and C17 can inject spin-polarized electrons into the block C13 so that a magnetic field occurs in at least a part of the optical path of light that propagates through the inside of the block C13.

Note that the phase-modulation amount of each of the microcells C can be set, for example, through machine learning. A model used in this machine learning can be, for example, a model (i) in which a two-dimensional intensity distribution of signal light input into the optical modulation element 21*ai* is an input and a two-dimensional intensity distribution of signal light output from the optical modulation element 21*ai* is an output and (ii) which includes a phase-modulation amount of each of the microcells C as a parameter. Here, the two-dimensional intensity distribution of the signal light input into the optical modulation element 21*ai* means a set of intensities of beams of signal light input into the respective microcells C that constitute the optical modulation element 21*ai*. Further, the two-dimensional intensity distribution of the signal light output from the optical modulation element 21*ai* means a set of intensities of beams of signal light input into microcells C constituting an optical modulation element 21*ai*+1 disposed to follow the optical modulation element 21*ai* or a set of intensities of beams of signal light input into cells constituting a light receiving device disposed to follow the optical modulation element 21*ai*.

Variations

The following will describe variations of the embodiments. In the first or second example, the plurality of microcells C are described as having "thicknesses or refractive indices that are independently set." Further, the plurality of microcells C may have "refractive indices that are independently settable." For example, by applying a voltage between the electrodes C16 and C17, the microcell C shown in FIG. 6 can modulate the amount of electrons injected into the block C13, and accordingly can modulate the phase of the incident light. This modulation is based on a Kerr effect. Thus, according to the voltage between the electrodes C16 and C17, the microcell C can independently change the refractive index, accordingly, the phase-change amount.

The microcell C shown in FIG. 6 is of a reflective type, and allows the incident light Lin to be reflected by the reflecting surface C134 of the substrate C12 so as to allow the reflected light to outgo as outgoing light Lout. Alternatively, the microcell C may be of a transmissive type. That is, the microcell C shown in FIG. 6 may include a polarizing plate in place of the substrate C12. This can provide a transmissive type microcell C that allows the incident light Lin to pass through the substrate C12 in the X-axis negative direction so as to allow the light to outgo as outgoing light.

As discussed above, the plurality of cells (microcells C) can have (i) thicknesses or refractive indices that are independently set or (ii) refractive indices that are independently settable. Further, these cells are applicable to both the transmissive optical modulation elements 11*ai* and the reflective optical modulation elements 21*ai*.

In a case where the optical modulation element group 11 includes an optical modulation element 11*ai* constituted by microcells C whose phase-change amounts (thicknesses or refractive indices) are changeable, the optical computing device 1 may include a control section that independently controls the phase-change amounts (refractive indices) of the microcells C of the optical modulation element 11*ai*. With this, it is possible to change the content of optical computing to be executed by the optical computing device 1. Note that this applies not only to the transmissive optical modulation element 11*ai* but also to the reflective optical modulation element 21*ai*. That is, the optical computing device 2 may include a control section that independently controls the phase-change amounts (refractive indices) of the microcells C of the optical modulation element 21*ai*.

Each of the optical modulation elements 11*ai* and 21*ai* may be made of a gel (dried gel). For example, a gel can be formed on the transparent substrate C10 shown in FIG. 3 in a pattern corresponding to the pillars P.

Furthermore, the plurality of optical modulation elements 11*a*1 to 11*a*4 may be integrated together. In the dried gel, the plurality of optical modulation elements 11*a*1 to 11*a*4 can be formed integrally. This makes it easier to form the plurality of optical modulation elements 11*a*1 to 11*a*4. Similarly, the plurality of optical modulation elements 21*a*1 to 21*a*4 may be formed integrally in the dried gel.

The dried gel 11 is transmissive to signal light, and can be obtained by drying a gel. The term "gel" is a generic term for a solid matter including a network formed by dispersoids connected with each other. The gel can absorb a solvent into the network, so that the gel can become a swollen gel. Further, when the solvent in the gel is dried, the gel shrinks while releasing the solvent. Consequently, the gel is turned into a dried gel. Here, what is used as the gel made into the dried gel 11 by drying the solvent therein is a polymer gel. It is particularly preferable to use a gel that is subjected to dehydration shrinkage so that the gel shrinks while keeping a similar shape, e.g., a gel used in the Implosion Fabrication process.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

An optical computing device in accordance with a first aspect of one or more embodiments includes: an optical modulation element group including at least one optical modulation element, the optical modulation element group being configured to carry out predetermined first optical computing with respect to first signal light traveling along a specific optical path and to carry out predetermined second optical computing with respect to second signal light traveling along the specific optical path in a direction opposite to the first signal light.

With the above configuration, it is possible to execute bidirectional optical computing. That is, it is possible to execute meaningful optical computing either in a case where signal light is input into the optical modulation element group in a specific direction or in a case where signal light is input into the optical modulation element group in the direction opposite to the specific direction.

An optical computing device in accordance with a second aspect of one or more embodiments employs, in addition to the configuration of the first aspect, a configuration in which: the at least one optical modulation element includes a plurality of cells having (i) thicknesses or refractive indices that are independently set or (ii) refractive indices that are independently settable.

With the above configuration, phase-change amounts of beams of signal light passing through the cells are set independently for the respective cells or are settable independently for the respective cells.

An optical computing device in accordance with a third aspect of one or more embodiments employs, in addition to the configuration of the second aspect, a configuration that further includes: a control section that independently controls the refractive indices of the plurality of cells.

With the above configuration, it is possible to control, with use of the control section, the phase-change amounts of the beams of the signal light passing through the cells.

An optical computing device in accordance with a fourth aspect of one or more embodiments employs, in addition to the configuration of the first or second aspect, a configuration in which: the at least one optical modulation element is formed in a gel.

The above configuration enhances stability of optical computing carried out by the at least one optical modulation element.

An optical computing device in accordance with a fifth aspect of one or more embodiments employs, in addition to the configuration of any one of the first to fourth aspects, a configuration in which: the optical modulation element group includes two or more optical modulation elements arranged along the specific optical path.

With the above configuration, it is possible to execute bidirectional multiple-stage optical computing.

An optical computing device in accordance with a sixth aspect of one or more embodiments employs, in addition to the configuration of the fifth aspect, a configuration in which: the first optical computing and the second optical computing are different types of optical computing.

With the above configuration, it is possible to execute different types of optical computing between in a case where signal light is input into the optical modulation element group in a specific direction and in a case where signal light is input into the optical modulation element group in the direction opposite to the specific direction.

An optical computing device in accordance with a seventh aspect of one or more embodiments employs, in addition to the configuration of the fifth aspect, a configuration in which: the first optical computing and the second optical computing are a same type of optical computing.

With the above configuration, it is possible to execute the same type of optical computing both in a case where signal light is input into the optical modulation element group in the specific direction and in a case where signal light is input into the optical modulation element group in the direction opposite to the specific direction.

An optical computing device in accordance with an eighth aspect of one or more embodiments employs, in addition to the configuration of any one of the first to seventh aspects, a configuration in which: the optical modulation element group includes at least one transmissive optical modulation element; and the specific optical path is a linear optical path extending through each of the at least one optical modulation element belonging to the optical modulation element group.

With the above configuration, it is possible to execute bidirectional optical computing with use of the transmissive optical modulation element.

An optical computing device in accordance with a ninth aspect of one or more embodiments employs, in addition to the configuration of any one of the first to seventh aspects, a configuration in which: the optical modulation element group includes at least one reflective optical modulation element; and the specific optical path is a zigzag optical path extending through each of the at least one optical modulation element belonging to the optical modulation element group.

With the above configuration, it is possible to execute bidirectional optical computing with use of the reflective optical modulation element.

An optical computing device in accordance with a tenth aspect of one or more embodiments employs, in addition to the configuration of any one of the first to ninth aspects, a configuration in which: the first signal light and the second signal light are different in wavelength from each other.

With the above configuration, it is easier to make the forward optical computing coincide with the first optical computing and to make the backward optical computing coincide with the second optical computing.

An optical computing device in accordance with an eleventh aspect of one or more embodiments employs, in addition to the configuration of any one of the first to tenth aspects, a configuration in which: the first signal light and the second signal light are different in polarization direction from each other.

With the above configuration, it is easier to make the forward optical computing coincide with the first optical computing and to make the backward optical computing coincide with the second optical computing.

An optical computing device in accordance with a twelfth aspect of one or more embodiments employs, in addition to the configuration of any one of the first to eleventh aspects, a configuration in which: the first signal light and the second signal light are different in coherence length from each other.

With the above configuration, it is easier to make the forward optical computing coincide with the first optical computing and to make the backward optical computing coincide with the second optical computing.

An optical computing device in accordance with a thirteenth aspect of one or more embodiments employs, in addition to the configuration of any one of the first to twelfth aspects, a configuration further including: one of or both of (i) a set of a first light emitting device that generates the first signal light having not been subjected to the first optical computing yet and a second light emitting device that generates the second signal light having not been subjected to the second optical computing yet and (ii) a set of the first light receiving device that detects the first signal light having been subjected to the first optical computing and a second light receiving device that detects the second signal light having been subjected to the second optical computing.

With the above configuration, it is possible to realize (i) bidirectional optical computing even without use of an external light emitting device and/or (ii) bidirectional optical computing even without use of an external light receiving device.

An optical computing device in accordance with a fourteenth aspect of one or more embodiments employs, in addition to the configuration of any one of the first to thirteenth aspects, a configuration further including: one of or both of (i) a first optical element that allows one of the first signal light having not been subjected to the first optical computing yet and the second signal light having been subjected to the second optical computing to transmit therethrough and reflects the other and (ii) a second optical element that allows one of the second signal light having not been subjected to the second optical computing yet and the first signal light having been subjected to the first optical computing to transmit therethrough and reflects the other.

The above configuration makes it possible (i) to arrange the first light emitting device, which generates the first signal light, and the second light receiving device, which detects the second signal light, at different locations and/or (ii) to arrange the second light emitting device, which generates the second signal light, and the first light receiving device, which detects the first signal light, at different locations.

An optical computing method in accordance with a fifteenth aspect of one or more embodiments uses an optical modulation element group including at least one optical modulation element, the optical computing method including the steps of: (a) carrying out predetermined first optical computing with respect to first signal light traveling along a specific optical path; and (b) carrying out predetermined second optical computing with respect to second signal light traveling along the specific optical path in a direction opposite to the first signal light, the steps (a) and (b) being carried out by using the optical modulation element group.

With the above configuration, it is possible to execute bidirectional optical computing.

A method in accordance with a sixteenth aspect of one or more embodiments for manufacturing an optical computing device is a method for manufacturing an optical computing device that includes an optical modulation element group including at least one optical modulation element, the method including the step of: creating the optical modulation element group so that the optical modulation element group carries out predetermined first optical computing with respect to first signal light traveling along a specific optical path and predetermined second optical computing with respect to second signal light traveling along the specific optical path in a direction opposite to the first signal light.

With the above configuration, it is possible to manufacture an optical computing device that executes bidirectional optical computing.

REFERENCE SIGNS LIST

1, 2: optical computing device
11, 21: optical modulation element group
11*ai*, 21*ai*: optical modulation element
121, 221: first light emitting device
122, 222: second light emitting device
131, 231: first light receiving device
132, 232: second light receiving device
141, 241: first optical element
142, 242: second optical element

The invention claimed is:

1. An optical computing device comprising:

an optical modulation element group including optical modulation elements, wherein the optical modulation element group executes:

first optical computing with respect to a first signal light traveling along an optical path, and second optical computing with respect to a second signal light traveling along the optical path in a direction opposite to a traveling direction of the first signal light, each of the optical modulation elements includes cells having either thicknesses that are independently set or refractive indices that are independently set, and the optical modulation element group executes the first optical computing and the second optical computing through interference among signal light beams diffracted by the cells and having different phases.

2. The optical computing device according to claim 1, wherein the optical computing device independently controls the refractive indices of the cells.

3. The optical computing device according to claim 1, wherein a gel includes the optical modulation elements in the gel.

4. The optical computing device according to claim 1, wherein the optical modulation elements are arranged along the optical path.

5. The optical computing device according to claim 4, wherein a type of the first optical computing is different from a type of the second optical computing.

6. The optical computing device according to claim 4, wherein a type of the first optical computing is the same as a type of the second optical computing.

7. The optical computing device according to claim 1, wherein each of the optical modulation elements is a transmissive optical modulation element, and the optical path is a linear optical path extending through each of the optical modulation elements.

8. The optical computing device according to claim 1, wherein each of the optical modulation elements is a reflective optical modulation element, and the optical path is a zigzag optical path extending through each of the optical modulation elements.

9. The optical computing device according to claim 1, wherein a wavelength of the first signal light is different from a wavelength of the second signal light.

10. The optical computing device according to claim 1, wherein a polarization direction of the first signal light is different from a polarization direction of the second signal light.

11. The optical computing device according to claim 1, wherein a coherence length of the first signal light is different from a coherence length of the second signal light.

12. The optical computing device according to claim 1, further comprising:

one or both of:

a set of a first light emitting device that generates the first signal light before the first optical computing and a second light emitting device that generates the second signal light before the second optical computing, and a set of a first light receiving device that detects the first signal light after the first optical computing and a second light receiving device that detects the second signal light after the second optical computing.

13. The optical computing device according to claim 1, further comprising:

one or both of:

a first optical element that:

transmits one of the first signal light before the first optical computing and the second signal light after the second optical computing, and reflects the other of the first signal light before the first optical computing and the second signal light after the second optical computing, and a second optical element that:

transmits one of the second signal light before the second optical computing and the first signal light after the first optical computing, and reflects the other of the second signal light before the second optical computing and the first signal light after the first optical computing.

14. An optical computing method comprising:

executing, by an optical modulation element group, first optical computing with respect to a first signal light traveling along an optical path; and executing, the optical modulation element group, second optical computing with respect to a second signal light traveling along the optical path in a direction opposite to a traveling direction of the first signal light, wherein the optical modulation element group includes optical modulation elements, each of the optical modulation elements includes cells having either thicknesses that are independently set or refractive indices that are independently set, and the first optical computing and the second optical computing are executed through interference among signal light beams diffracted by the cells and having different phases.

15. A method for manufacturing an optical computing device that includes an optical modulation element group including optical modulation elements, the method comprising:

creating the optical modulation element group such that the optical modulation element group executes first optical computing with respect to a first signal light traveling along an optical path and second optical computing with respect to a second signal light traveling along the optical path in a direction opposite to a traveling direction of the first signal light, wherein each of the optical modulation elements includes cells having either thicknesses that are independently set or refractive indices that are independently set, and the optical modulation element group executes the first optical computing and the second optical computing through interference among signal light beams diffracted by the cells and having different phases.

* * * * *